No. 672,785. Patented Apr. 23, 1901.
P. LAHR.
NUT LOCK.
(Application filed Oct. 25, 1900.)
(No Model.)
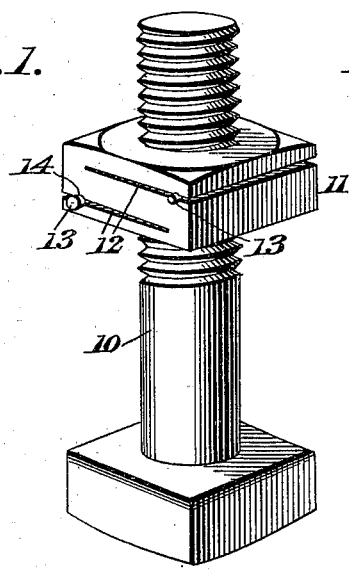
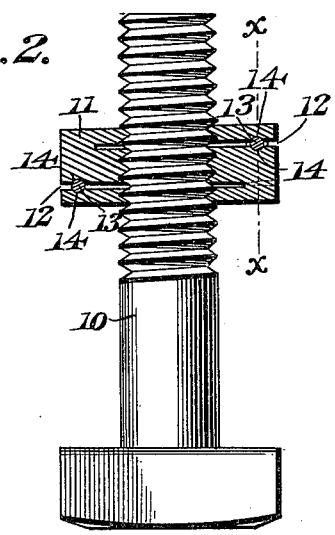
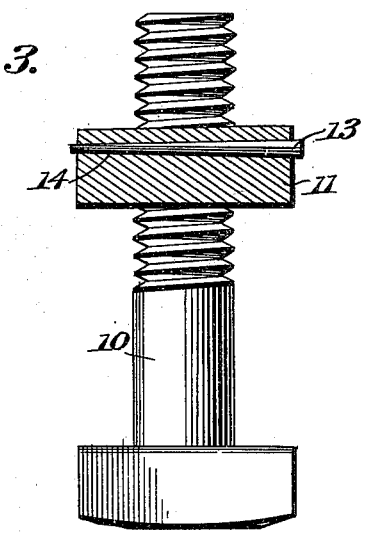
Witnesses
Edwin G. McKee
B. G. Foster
Peter Lahr Inventor
By
Attorney
THE NORRIS PETERS CO., PHOTO-LITHO., WASHINGTON, D. C.

UNITED STATES PATENT OFFICE.

PETER LAHR, OF PRESCOTT, IOWA, ASSIGNOR OF ONE-THIRD TO
J. PRENTISS CLARK, OF CORNING, IOWA.

NUT-LOCK.

SPECIFICATION forming part of Letters Patent No. 672,785, dated April 23, 1901.

Application filed October 25, 1900. Serial No. 34,365. (No model.)

*To all whom it may concern:*

Be it known that I, PETER LAHR, a citizen of the United States, residing at Prescott, in the county of Adams and State of Iowa, have invented a new and useful Nut-Lock, of which the following is a specification.

The present invention relates to improvements in nut-locks; and the object thereof is to provide a nut so constructed that it may be clamped in powerful binding engagement with the bolt, whereby it is securely held against accidental turning thereon. This object is accomplished by providing a nut made of a plurality of sections which are arranged to be set at different angles to each other, whereby said sections will be brought into binding engagement with the bolt, preferably upon different sides of the same. One means of accomplishing this object is illustrated in the accompanying drawings and is described in the following specification, of which said drawings form a part; but it will be understood that the invention shown and described is capable of modification and change within the scope of the appended claims.

In the drawings, Figure 1 is a perspective view of a screw-threaded bolt, showing the improved nut upon the same and locked thereto. Fig. 2 is a longitudinal section thereof. Fig. 3 is a vertical section taken on the line *x x* of Fig. 2. Fig. 4 is a detail view of the locking-key. Figs. 5 and 6 are modified forms of the same.

Similar numerals of reference designate corresponding parts in the several figures of the drawings.

In the construction illustrated an ordinary screw-threaded bolt 10 is shown, upon which is arranged the improved nut 11. This nut in the form shown comprises an angular body having the usual screw-threaded opening to receive the bolt. The nut is provided with a pair of kerfs 12, cut in from opposite sides thereof and arranged in different planes. These kerfs overlap, and thus form a practically Z-shaped nut made of three distinct superposed sections, which when spread apart to change their angular relation will throw sections of the screw-threaded opening out of alinement, and thereby bind upon opposite sides of the bolt. For the purpose of spreading the sections tapering keys 13 are provided, which have smooth surfaces to permit their being readily driven into the kerfs, which are preferably provided with correspondingly-tapered seats or keyways 14, that receive said keys and prevent their lateral displacement. These keys are preferably conicocylindrical, as shown in Fig. 4; but they may be of other forms—for instance, rectangular or triangular in cross-section, as shown in Figs. 5 and 6—in which case the seats will be of corresponding form. The keyways are preferably arranged in opposite directions and taper in the direction in which the nut would be rotated to screw it down upon the bolt, so that when the keys, which are also arranged in opposite directions, are driven in the jar occasioned thereby will not tend to loosen the nut from the article upon which it is screwed, but, on the other hand, will force it into tighter engagement with the same.

The operation of the improved nut will be evident. It is first threaded upon the bolt in the ordinary manner and screwed down upon the article to be held thereby. The keys or pins are thereupon inserted and driven home in the respective keyways. This will spread the sections apart, throwing the sections of the bolt-receiving opening out of alinement and clamping the sections at different points upon the bolt, thus securing the nut rigidly in place. Furthermore, as clearly shown in Figs. 1 and 3, the small ends of the keys are arranged to project beyond the nut, and thus can be struck by a hammer or other instrument when it is desired to move said keys out of binding engagement.

From the foregoing it is thought that the construction, operation, and many advantages of the herein-described invention will be apparent to those skilled in the art without further description, and it will be understood that various changes in size, shape, proportion, and minor details of construction may be resorted to without departing from the spirit or sacrificing any of the advantages of the invention.

Having now described my invention, what I claim as new, and desire to secure by Letters Patent, is—

1. A lock-nut comprising a body having a bolt-receiving opening, and a plurality of kerfs located in different planes and intersecting the bolt-receiving opening thus forming a plurality of sections adapted to be spread apart to clamp different portions of a bolt, said kerfs being provided with oppositely-arranged tapered keyways, and keys adapted to be driven into said keyways in opposite directions to spread the sections apart and clamp them upon different portions of a bolt passing through the same.

2. A lock-nut comprising a body having a screw-threaded bolt-receiving opening and a kerf intersecting said opening and forming a pair of sections adapted to be spread apart, said kerf being provided with a keyway tapered in the direction in which the nut is rotated when screwed down upon a bolt, and a tapered key corresponding to said keyway and arranged to be driven in the same to spread the sections apart to bind upon a bolt.

3. A lock-nut comprising a body, having a plurality of overlapping kerfs extending in from different sides and different planes, thus forming a plurality of sections adapted to be spread apart to clamp different portions of a bolt, said kerfs being provided with oppositely-arranged tapered keyways, and keys adapted to be driven into said keyways in opposite directions to spread the sections apart and clamp them upon different portions of a bolt passing through the same.

In testimony that I claim the foregoing as my own I have hereto affixed my signature in the presence of two witnesses.

PETER LAHR.

Witnesses:
J. B. DAVIS,
F. J. MURPHY.